(12) United States Patent
Li et al.

(10) Patent No.: US 11,068,713 B1
(45) Date of Patent: Jul. 20, 2021

(54) VIDEO-BASED INTELLIGENT ROAD TRAFFIC UNIVERSAL ANALYSIS

(71) Applicants: Xiaopeng Li, Tampa, FL (US); Dongfang Zhao, Tampa, FL (US)

(72) Inventors: Xiaopeng Li, Tampa, FL (US); Dongfang Zhao, Tampa, FL (US)

(73) Assignee: University of South Florida, Tampa, FL (US)

( * ) Notice: Subject to any disclaimer, the term of this patent is extended or adjusted under 35 U.S.C. 154(b) by 175 days.

(21) Appl. No.: 16/519,698

(22) Filed: Jul. 23, 2019

Related U.S. Application Data

(60) Provisional application No. 62/701,978, filed on Jul. 23, 2018.

(51) Int. Cl.
*G06K 9/00* (2006.01)
*G08G 1/01* (2006.01)

(52) U.S. Cl.
CPC ........ *G06K 9/0063* (2013.01); *G06K 9/00711* (2013.01); *G06K 9/00798* (2013.01); *G08G 1/0125* (2013.01)

(58) Field of Classification Search
None
See application file for complete search history.

(56) References Cited

U.S. PATENT DOCUMENTS

| | | | | |
|---|---|---|---|---|
| 10,628,671 | B2 * | 4/2020 | Zang | G06K 9/469 |
| 2009/0300067 | A1 * | 12/2009 | Denaro | B60W 40/076 |
| 2010/0231721 | A1 * | 9/2010 | Meloche | G08G 5/065 |
| | | | | 348/159 |
| 2011/0170744 | A1 * | 7/2011 | Malinovskiy | G06K 9/00785 |
| | | | | 382/103 |
| 2013/0100286 | A1 * | 4/2013 | Lao | G08G 1/04 |
| | | | | 348/148 |
| 2013/0300870 | A1 * | 11/2013 | Messely | G01S 7/4026 |
| | | | | 348/148 |
| 2017/0236284 | A1 * | 8/2017 | Elliethy | G06T 7/33 |
| | | | | 382/294 |

* cited by examiner

*Primary Examiner* — Fayyaz Alam
(74) *Attorney, Agent, or Firm* — Thomas | Horstemeyer, LLP

(57) ABSTRACT

Disclosed are various embodiments that extract vehicle trajectories from aerial videos. A vehicle track comprising pixel coordinate points is obtained. The pixel coordinate points are converted to relative coordinate points. At least one vehicle trajectory is extracted based at least in part on the vehicle track and the relative coordinate points. A lane structure is generated that is based on the at least one vehicle trajectory.

20 Claims, 9 Drawing Sheets

160

160

VIDEO-BASED INTELLIGENT ROAD TRAFFIC UNIVERSAL ANALYSIS

CROSS-REFERENCE TO RELATED APPLICATIONS

This application claims the benefit of and priority to U.S. Provisional Patent Application No. 62/701,978 entitled "Video-Based Intelligent Road Traffic Universal Analysis Tool (VIRTUAL)" filed on Jul. 23, 2018, which is expressly incorporated by reference as if fully set forth herein in its entirety.

NOTICE OF GOVERNMENT-SPONSORED RESEARCH

This invention was made with government support 1558887 awarded by the National Science Foundation. The government has certain rights to the invention.

BACKGROUND

High-definition video and existing vehicle trajectory data sets can help researchers design traffic simulation models and extract traffic safety measures for understanding and managing highway traffic. The vehicle trajectory data in the data set are extracted from videos taken by multiple digital video cameras installed at different places near the freeway segments of interest. Vehicles in these videos are detected by a vehicle detection algorithm and tracked based on a zero-mean cross-correlation matching algorithm. Lane markings are identified manually in order to find lane numbers of vehicles.

However, existing approaches can fail to detect some vehicles, lose track of vehicles, result in "collisions of trajectories," or result in unrealistically large acceleration or speed magnitudes. Errors in vehicle trajectory data can be particularly troublesome for testing and validation of car following models or conducting traffic safety assessment.

BRIEF DESCRIPTION OF THE DRAWINGS

The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
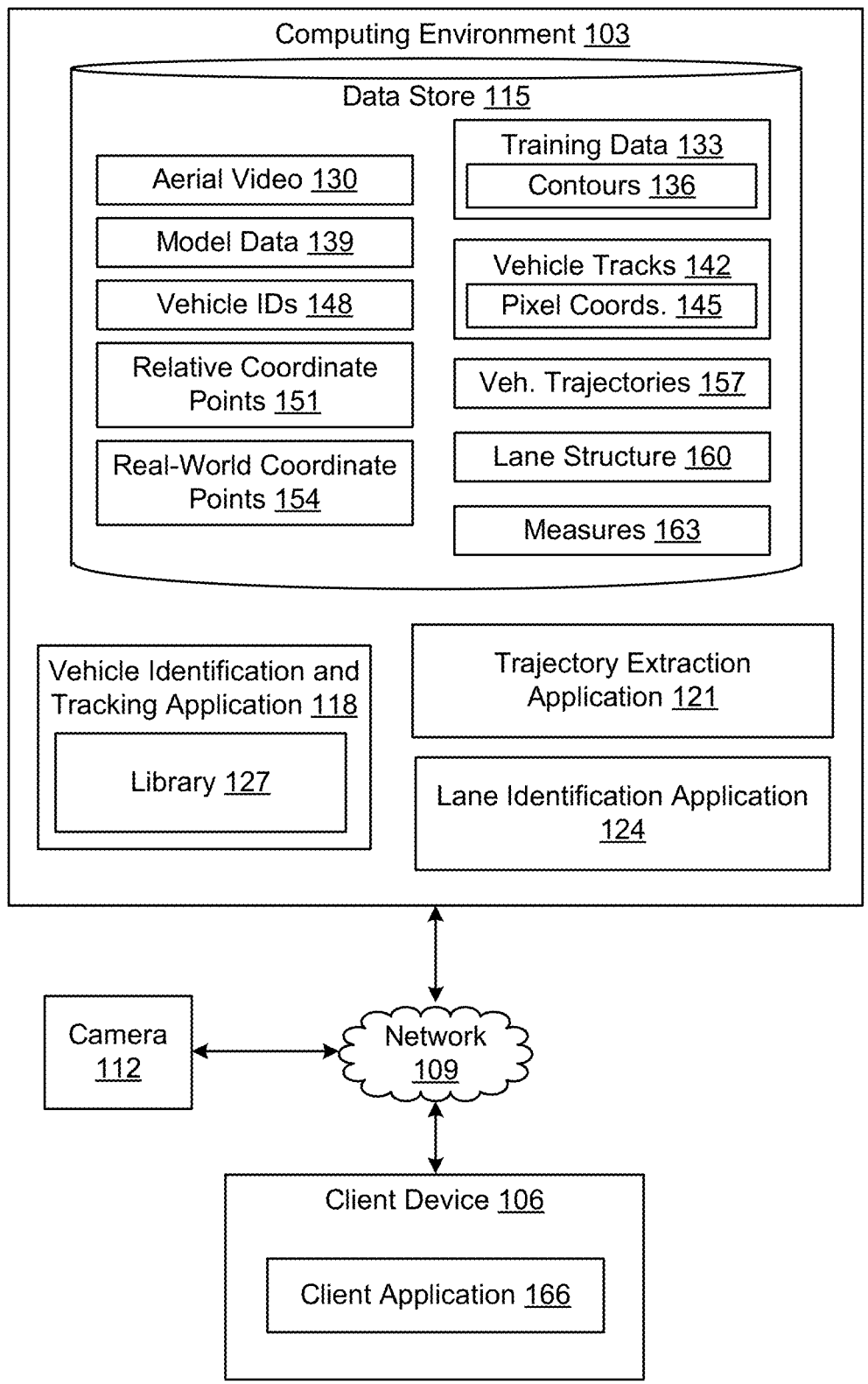
FIG. 1 is a drawing of a networked environment according to various embodiments of the present disclosure.

The present disclosure relates to extracting vehicle trajectories from aerial videos. It is often desirable to record videos above (or near) segments of interest using a helicopter, drone, unmanned aerial vehicle, or other asset capable of recording a video showing vehicles that flow as traffic through the segment of interest. Such videos, known as aerial videos, can be analyzed to create tracks for vehicles that appear in multiple frames of the aerial videos. Vehicle tracks can include pixel coordinate points associated with the vehicles in the aerial videos. Without more, it can be difficult to obtain traffic measures (e.g., speed and acceleration for individual vehicles, or throughput and density over an aggregate of vehicles) that are needed for general traffic studies.

Various embodiments of the present disclosure can convert the pixel coordinate points to relative coordinate points, or real-world coordinate points, by detecting a rotation parameter relative to a reference point and a shifting parameter relative to a reference frame. Accurate vehicle trajectories can be extracted that are based on the vehicle tracks and the relative coordinate points. Lane structures for freeways, roundabouts, etc., can then be generated based on the vehicle trajectories.

The present disclosure provides an approach to extract vehicle trajectories from aerial videos that can include vehicle identification and tracking, camera rotation and shifting correction, lane identification, and other features that will be further described below. The disclosed approach identifies vehicles using the advanced Mask R-CNN model and tracks vehicles according to their movement properties. The disclosed approach can calculate camera rotation and shifting parameters using a binary search correlation-based matching algorithm. The disclosed approach can also generate lane structures based on the topographic properties of extracted trajectories. The disclosed approach was tested using two aerial video examples, one capturing freeway traffic and another capturing roundabout traffic. The results show that vehicle trajectories can be extracted accurately. The disclosed approach provides a promising solution to extract real-world long vehicle trajectories from aerial videos.

High-definition vehicle trajectory data can help researchers design traffic simulation models and extract traffic safety measures for understanding and managing highway traffic. Enormous efforts have been made to collect real-world vehicle trajectory data sets. Existing vehicle trajectory data sets include lidar-based trajectory data sets, radar-based trajectory data sets, GPS-based trajectory data sets and aerial video-based trajectory data sets. This disclosure focuses on aerial video-based trajectory data set generation as it provides trajectory data with relatively wide spatial and temporal coverage.

Existing aerial-video based trajectory data sets can include the Next Generation Simulation (NGSIM) data set https://ops.fhwa.dot.gov/trafficanalysistools/ngsim.htm and/or the Highway Drone (HighD) data set https://www.highd-dataset.com/#. The NGSIM data set was collected by the Federal Highway Administration in 2007. The vehicle trajectory data in the data set can be extracted from videos taken by multiple digital video cameras installed at different places near the freeway segments of interest. Vehicles in these videos can be detected by a feature-based vehicle detection algorithm and tracked based on a zero-mean cross-correlation matching algorithm. Lane markings can be identified manually in order to find lane numbers of vehicles. However, based on the results, more than 10 percent of vehicles are not detected successfully and tracks can be lost for several consecutive frames. Because of the vehicle detection error, after accounting for vehicle length, the trajectories in the data set often over run their leaders seemingly resulting in "collisions of trajectories" and the acceleration often exhibits unrealistically large magnitudes. Since the trajectories are interpolated between two points in space observed many seconds apart caused by track loss between frames, the vehicles' speed exhibits unrealistic piecewise constant behavior. Obviously, these errors in the NGSIM data set are particularly troublesome for testing and validation of car following models or conducting traffic safety assessment.

In comparison with the NGSIM data set, the HighD data set discussed in "The highD Dataset: A Drone Dataset of Naturalistic Vehicle Trajectories on German Highways for Validation of Highly Automated Driving Systems" by R. Krajewski, J. Bock, L. Kloeker, and L. Eckstein (2018 21st International Conference on Intelligent Transportation Systems (ITSC). IEEE, 2018, pp. 2118-2125), which is hereby incorporated by reference in its entirety, and collected by the Ika team in RWTH Aachen University, provides more accurate trajectory data. R. Krajewski, et al. propose to adapt the U-Net, a common neural network architecture, to detect and track vehicles from aerial videos. The aerial videos were recorded by drones that hover next to the German highways and capture the traffic from a bird's eye view on road sections. The U-Net was then applied to each frame of the videos to detect and track vehicles. Lane markings were annotated manually. The results showed that it has higher detect accuracy than the NGSIM data set because of the advanced detection algorithm and high video resolution. However, the trajectory extraction method used in the HighD data is not capable of extracting trajectories from aerial videos when cameras are rotating or shifting when capturing videos. What's more, manually identifying lane structures can be nearly impossible when the lane structures in a study area are complicated.

To address existing trajectory extracting limitations from aerial videos, this disclosure proposes an approach for vehicle trajectory extraction. The disclosed approach can apply the Mask Region-based Convolution Neural Network (Mask R-CNN) to detect vehicles so as to track vehicles according to its moving properties. Additional details are provided in "Mask R-CNN" by K. He, G. Gkioxari, P. Dollar, and R. Girshick (Proceedings of the IEEE International Conference on Computer Vision, 2017, pp. 2961-2969), which is hereby incorporated by reference in its entirety. Furthermore, the disclosed approach can correct camera rotation and shifting using a binary search correlation-based matching algorithm, and identify lanes. The disclosed approach which includes applying Mask R-CNN can not only efficiently detect vehicles but also generate a high-quality segmentation mask for each vehicle.

Moreover, the disclosed approach can construct lane structures according to topographic properties of vehicle trajectories. By extracting lane numbers, the disclosed approach yields high flexibility to the vehicle trajectory extraction process, which enables extracting long vehicle trajectories from aerial videos of road traffic with complicated lane structures. In the following discussion, a general description of the system and its components is provided, followed by a discussion of the operation of the same.

With reference to FIG. 1, shown is a networked environment 100 according to various embodiments. The networked environment 100 includes a computing environment 103 and a client device 106 which are in data communication with each other via a network 109. The network 109 includes, for example, the Internet, intranets, extranets, wide area networks (WANs), local area networks (LANs), wired networks, wireless networks, cable networks, satellite networks, or other suitable networks, etc., or any combination of two or more such networks. One or more cameras 112 may be in communication with components of the computing environment 103 via the internet, an internal network, or another network 109.

The computing environment 103 may comprise, for example, a server computer or any other system providing computing capability. Alternatively, the computing environment 103 may employ a plurality of computing devices that may be arranged, for example, in one or more server banks or computer banks or other arrangements. Such computing devices may be located in a single installation or may be distributed among many different geographical locations. For example, the computing environment 103 may include a plurality of computing devices that together may comprise a hosted computing resource, a grid computing resource, and/or any other distributed computing arrangement. In some cases, the computing environment 103 may correspond to an elastic computing resource where the allotted capacity of processing, network, storage, or other computing-related resources may vary over time.

Various applications and/or other functionality may be executed in the computing environment 103 according to various embodiments. Also, various data is stored in a data store 115 that is accessible to the computing environment 103. The data store 115 may be representative of a plurality of data stores 115 as can be appreciated. The data stored in the data store 115, for example, is associated with the operation of the various applications and/or functional entities described below.

The components executed in the computing environment 103, for example, include a vehicle identification and tracking application 118, a trajectory extraction application 121, a lane identification application 124, and other applications, services, processes, systems, engines, or functionality not discussed in detail herein.

The vehicle identification and tracking application 118 obtains one or more videos from the data store 115, the camera 112, or other video sources. The videos may be in an uncompressed or compressed format. The vehicle identification and tracking application 118 is executed to identify and track vehicles in each frame of the video efficiently and correctly. Using computer vision and/or pattern recognition, the vehicle identification and tracking application 118 recognizes vehicles on and creates outside contours of the vehicles. A contour is data that allows a machine learning or computer vision tool to estimate the outer dimensions of the vehicle. Contours of the same vehicle across different frames can be tagged with the same vehicle ID.

The vehicle identification and tracking application 118 can include a library 127 that includes one or more real-time computer vision libraries, such as the openCV libraries. The library 127 can also correspond to one or more training frameworks or software libraries used to design, build, and train machine learning models. Examples training frameworks include TensorFlow™, Caffe, Apache® Singa, Microsoft® Cognitive Toolkit (CNTK), Theano, and Torch. This disclosure can train and use a convolutional neural network (CNN) library such as the Mask R-CNN as the library 127, which can be implemented for example on Python 3, Keras, or TensorFlow™ to provide the vehicle identification and tracking application 118 with features for object detection and segmentation. The Mask R-CNN model can generate bounding boxes and segmentation masks for each instance of an object in an image.

The trajectory extraction application 121 is executed to extract vehicle trajectories from a video associated with a location. The trajectory extraction application 121 can perform rotation and shifting correction, conduct 3D reconstructions for each frame of the aerial video 130, and other functions helpful to calculate real-world coordinates of vehicles and to extract vehicle trajectories of vehicles in the frames.

The lane identification application 124 is executed to identify and update lane structures (including traffic lanes) at the location, and to identify a lane for each vehicle appearing in the aerial video 130. The lane identification application 124 can construct central paths of all lanes and connections between lanes. Once a vehicle's trajectory is updated, its current location can be matched with one (e.g., when the vehicle is driving on a lane) or two (e.g., when the vehicle is during lane changing) lanes based on their geometric and kinematic relationships. The lane identification application 124 updates relevant lane central paths based on the updated vehicle trajectory.

The data stored in the data store 115 includes, for example, an aerial video 130, training data 133, model data 139, vehicle tracks 142, vehicle identifiers 148, relative coordinate points 151, real-world coordinate points 154, vehicle trajectories 157, lane structures 160, measures 163, and potentially other data. The aerial video 130 includes a plurality of frames of video of a location that captures a traffic segment of interest. For example, the aerial video 130 can have been previously recorded by a drone, a helicopter, or other asset that was above the location. Or, the aerial video 130 could be a live stream from the camera 112. As described, the aerial video 130 can be a serial video comprising a number of frames. One of the frames of the aerial video 130 can be a reference frame that aids accurate vehicle trajectory extraction for a current frame of the aerial video 130. Alternatively, a frame that is stored in the data store 115 but is not one of the frames of the aerial video 130 can be the reference frame. The aerial video 130 can include data describing a camera or other source of the aerial video 130, including calibration or configuration data such as height, angle, field of view, or resolution, to aid in applying a camera calibration algorithm.

The training data 133 includes data to train a neural network to identify vehicles in one or more frames of the aerial video 130. The training data 133 can include data regarding contours 136 extracted from detected vehicles at the location. The model data 139 includes data regarding a machine learning model that can be created based on applying machine learning methods to the training data 133. The model data 139 can correspond to data for one or more models used to identify vehicles appearing in the aerial video 130. For example, the Mask R-CNN model can be trained locally to generate bounding boxes and segmentation masks for each instance of a vehicle in a frame of the aerial video 130.

The vehicle tracks 142 includes data regarding tracks of vehicles at the location, including pixel coordinate points 145. The vehicle identifiers 148 include data relating to identifications of vehicles. The vehicle identifiers 148 can for example be one or more identifiers that are associated with a vehicle representation extracted from the aerial video 130. The vehicle representation includes data related to identification of each instance of an object in one or more frames of the aerial video 130.

The relative coordinate points 151 include data that results from one or more functions (including iterative or recursive procedures) being applied to the pixel coordinate points 145. For example, it can be desirable to correct for a rotation, a shifting, or some other disturbance of a camera associated with the aerial video 130 that can cause the camera to drift from a reference point whose real-world coordinate is known. The real-world coordinate points 154 include data relating to real-world coordinates of each vehicle in the aerial video 130.

The vehicle trajectories 157 ($\mathcal{T}$) correspond to data about at least one vehicle trajectory (T) extracted from the aerial video 130. The lane structures 160 ($\mathcal{L}$) include data about lane structures, which can include lane identifiers ($L$), connections, and lane numbers, that are generated based on the at least one vehicle trajectory (T). The measures 163 include data related to measures needed for general traffic studies, including disaggregated (e.g., trajectory, speed, acceleration profiles, travel delay) and aggregated (throughput, speed, density) measures.

The client device 106 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The client device 106 may include a display. The display may comprise, for example, one or more devices such as liquid crystal display (LCD) displays, gas plasma-based flat panel displays, organic light emitting diode (OLED) displays, electrophoretic ink (E ink) displays, LCD projectors, or other types of display devices, etc. The client device 106 is configured to execute a browser or other client application 166. The client application 166 may be executed in a client device 106, for example, to access network content served up by the computing environment 100 and/or other servers, thereby rendering a user interface on the display.

The following sections introduce an approach for vehicle trajectory extraction and present the results of evaluating the disclosed approach with two aerial video examples and comparing the results with the NGSIM data set and the HighD data. A general description of the operation of the various components of the networked environment 100 is provided. To begin, an approach for extracting vehicle trajectories 157 from an aerial video 130 that captures a traffic segment of interest is disclosed. The disclosed approach can include vehicle identification and tracking, camera rotation and shifting correction, lane identification, and other features that will be further described below.

Vehicle Identification and Tracking. The vehicle identification and tracking application 118 locally trains the Mask R-CNN model to generate the model data 139, which can allow vehicles in each frame of the aerial video 130 to be identified and tracked. The vehicle identification and tracking application 118 generates the model data 139 that Mask R-CNN can then use to detect vehicles in each frame of the aerial video 130. Afterwards, the vehicle identification and tracking application 118 generates the vehicle tracks 142 by connecting pixel coordinate points 145 of the same vehicles according to vehicle moving properties (speed limit, acceleration limit, etc.)

To train the Mask R-CNN model locally, the vehicle identification and tracking application 118 generates training data 133 which can include a training data set from the aerial video 130 using a background extraction algorithm. A Gaussian mixture-based background/foreground segmentation algorithm can be applied to extract the background and foreground of each frame.

Since the vehicles are moving across frames of the aerial video 130, the contours 136 extracted by the vehicle identification and tracking application 118 can include noise. The vehicle identification and tracking application 118 matches the contours 136 in two consecutive frames by their distances or sizes, and can discard the contour 136 if no feasible match of the contour 136 is found. In this way, a portion of the vehicles in the aerial video 130 can be detected. The vehicle identification and tracking application 118 can extract contours 136 of these detected vehicles and create a training data 133 for vehicles. The Mask R-CNN model can be trained with the training data 133 generated by the vehicle identification and tracking application 118. With the locally trained Mask R-CNN model, the vehicle identification and tracking application 118 accurately detects vehicles in the aerial video 130 at a particular location of interest.

Rotation and Shifting Correction. To extract vehicle trajectories 157 from the aerial video 130, one problem is how to calculate real-world coordinate points 154 of each vehicle in each frame of the aerial video 130. The trajectory extraction application 121 generates one or more relative coordinate points 151 in pixels for each detected vehicle relative to a reference point whose real-world coordinate is known. By conducting 3D reconstruction to each frame of the aerial video 130, the trajectory extraction application 121 obtains one or more of the real-world coordinates 154, and can extract the trajectories 157. However, disturbances such as camera shake, rotation and shifting can cause the reference point drift to different positions across different frames. Especially, when a camera is following a fleet of vehicles, the reference point in the aerial video 130 can get outside of area of scope sometimes. Therefore, finding rotation and shifting variations between two consecutive frames is important for accurate extraction of the vehicle trajectories 157. In order to calculate rotation and shifting parameters between two consecutive frames, the trajectory extraction application 121 can use a binary search correlation-based matching algorithm.

The trajectory extraction application 121 sets $B_i$ as the background of the ith frame of a serial video such as the aerial video 130, where i is the number of a frame, $i \in \mathcal{I}$, $\mathcal{I} = 0, 1, 2, 3, \ldots, i, \ldots, I$. The background is extracted by a background subtraction algorithm. Define M as a mask of the frame. M can be in any shape or position as long as the backgrounds in two consecutive frames overlap in M. Let $B_i^M$ denote the subset of pixels of $B_i$ within M. Let P be a reference point in mask M. The rotation parameter for reference point P is denoted as $\theta_i^R$ in frame i relative to frame i−1. $\forall i \in \mathcal{I}$. Further, set $\theta_0^R = (0,0)$. Correspondingly, the shifting parameter can be defined as $S_i^R := (x_i^R, y_i^R)$ in frame i relative to frame i−1, where $x_i^R$ and $y_i^R$ are the components of the shifting parameter in x and y directions, respectively, $\forall i \in \mathcal{I}$. Further, set $S_\theta^R = (0, 0)$. The trajectory extraction application 121 sets the bounds to $\theta_i^B = [\theta_i^L, \theta_i^U]$, where $\theta_i^L$ is the lowest rotation angle and $\theta_i^U$ is the highest rotation angle between two consecutive frames. Set the bounds to $S_i^R(x, y)$ as $S_i^B = [S_i^L, S_i^U]$, where $S_i^L$ is the lower left limit and $S_i^U$ is the upper right limit of the shift between the two consecutive frames. With given rotation parameter $\theta^B \in \theta^B$ and shifting parameter $S_i^R \in S^B$, the trajectory extraction application 121 can transform frame i with the corresponding shifting and rotating operations. The trajectory extraction application 121 denotes the frame obtained after transforming frame i as frame i'. Define the correlation coefficient of the pixel values between $B_i^M$ M of frame i'. and $B_{i-1}^M$ of frame i−1 as $C(\theta_i^R, S_i^R)$ and set $C(\theta_0^R, S_0^R) = 1$.

According to the principle of binary research, the trajectory extraction application 121 can replace the lower bound $(\theta_i^L, S_i^L)$ with $(\theta_i^R, S_i^R)$ if $C(\theta_i^L, S_i^L) < C(\theta_i^U, S_i^U)$ or replace the upper bound $(\theta_i^U, S_i^U)$ with $(\theta_i^R, S_i^R)$ if $C(\theta_i^L, S_i^L) > C(\theta_i^U, S_i^U)$. By repeating the binary search, the trajectory extraction application 121 finds a precise rotation and shifting parameter when $|C(\theta_i^L, S_i^L) - C(\theta_i^U, S_i^U)| < \in$, where $\in$ represents the termination criteria of the iteration. The trajectory extraction application 121 sets the rotation and shifting parameter in the last iteration as $$\theta_i^R = \frac{\theta_i^L + \theta_i^U}{2}, S_i^R = \frac{s_i^L + s_i^U}{2}.$$

Therefore, the relative rotation parameter for frame i to frame 0 can be denoted as $\theta_i^A$ and calculated as $$\theta_i^A = \sum_{k=0}^{k=i} \theta_k^R$$

and the relative shifting parameter for frame i to frame 0 can be denoted as $S_i^A$ and calculated as $$S_i^A = \sum_{k=0}^{k=i} S_k^R.$$

Considering the frame point P as the origin in frame 0 and the relative coordinate to the frame point P in frame i as $(x_j^i, y_j^i)$ in frame j, there transition between $(x_j^i, y_j^i)$ and $(x_j^0, y_j^0)$ in Equation 1.

$$\begin{bmatrix} x_j^0 \\ y_j^0 \end{bmatrix} = \begin{bmatrix} \cos(\theta_i^A) & \sin(\theta_i^A) & S_i^A \cdot x \\ -\sin(\theta_i^A) & \sin(\theta_i^A) & S_i^A \cdot y \end{bmatrix} \begin{bmatrix} x_j^i \\ y_j^i \\ 1 \end{bmatrix} \quad (1)$$

With the transition Equation 1, any relative coordinate $(x_i^i, y_i^i)$ to the based pixel point P in frame i can be converted to the relative coordinate point $(x_i^0, y_i^0)$ to the based pixel point P in frame 0. With the relative pixel coordinates $(x_i^0, y_i^0)$ of vehicles in each frame i, $\forall i \in \mathcal{I}$, the trajectory extraction application 121 can easily obtain their real-world coordinates 154 by applying a camera calibration algorithm based on the configurations of the camera shooting the aerial video 130 (e.g., height, angle, field of view, resolution).

Lane Identification. The basic idea of the lane identification application 124 is to cluster segments of trajectories 157 within small distance apart into a new lane with the lane structure 160. To identify lane numbers semi-automatically, the lane identification application 124 reconstructs the lane structure 160 based on the extracted vehicle trajectories 157. Denote all extracted vehicle trajectories 157 as set $\mathcal{T}=\{T:=\{p_i, i\in[1, |T|]\}\}$ where T denotes an extracted trajectory and $p_i$ denotes a point of trajectory T. Starting with a lane structure 160 $\mathcal{L}=\{L:=\{q_j, j\in[1, |L|]\}\}$, where $L$ is a lane consisting of a set of points $q_j$ that are from the extracted trajectories 157 ($\mathcal{T}$) on lane ι. The lane identification application 124 traverses each point $p_i \in$, $\forall d \in \mathcal{T}$ in the set of extracted trajectories 157 ($\mathcal{T}$), and tests if each point $p_i \in \mathcal{T}$ belongs to any lane $L$ in the current lane structure 160 ($\mathcal{L}$). Without loss of generality, the lane identification application 124 sets the maximum distance between point $p_i$ and lane $L$ as $\Delta$ (predetermined threshold distance) when it belongs to the lane. The lane identification application 124 considers that point $p_i$ belongs to lane $L$, denoted as $p_i \vdash L$, if and only if there exists a point $q_j \in L$ whose distance to $p_i$ is less than $\Delta$, $$p_i \vdash L \leftrightarrow \exists d=|p_i-q_j|<\Delta, \forall q_j \in L.$$

If point $p_i$ does not belong to the current lane structure 160, denoted by $p_i \nvdash L$, it follows that $$p_i \nvdash L \leftrightarrow \forall d=|p_i-q_j| \geq \Delta, \forall q_j \in L, \forall L \in \mathcal{L}.$$

In this case, label the point $p_i$ as new point $p_i'$ and add it to the set of new points $S=\{p_i'\}$. For each vehicle trajectory (T), connect each set of the continuous new points as a new lane $L'=\{p_i'|p_i' \in S, p_{i+1}' \in S, i \in [1, |T|-1]\}$ and add it to the current lane structure 160, $\mathcal{L}=\mathcal{L} \cup \{L'\}$. If the trajectory (T) intersects lane $L$, then there are two cases: (1) the vehicle of trajectory (T) enters lane $L$ at point $q_j$, $$p_i \nvdash L, p_{i+1} \vdash L, |p_{i+1}-q_j|<\Delta, j \in [l_0, |L|-l_0],$$

where $l_0$ is the minimum length of the lanes in the aerial video 130; (2) the vehicle of trajectory (T) exits lane $L$ at point $q_j$, $$p_i \vdash L, p_{i+1} \nvdash L, |p_i-q_j|<\Delta, j \in [l_0, |L|-l_0].$$

At the intersections where $|p_{i+1}-q_j|<\Delta$, $j \in [l_0, |L|-l_0]$ replace lane $L$ by splitting it into two lanes at j, $$L \rightarrow \{q_1, \ldots, q_j\}\{q_{j+1}, \ldots, q_{|L|}\}.$$

As lane changing of trajectories 157 may result in incorrect lane splitting, the lane identification application 124 can remove the vehicle trajectories 157 for a vehicle trajectory (T) that change lanes. By traversing each point $p_i$, $\forall p_i \in T$ in each vehicle trajectory (T), $\forall T \in \mathcal{T}$, the lane identification application 124 can obtain a complete lane structure 160 $\mathcal{L}$.

Figure 2:
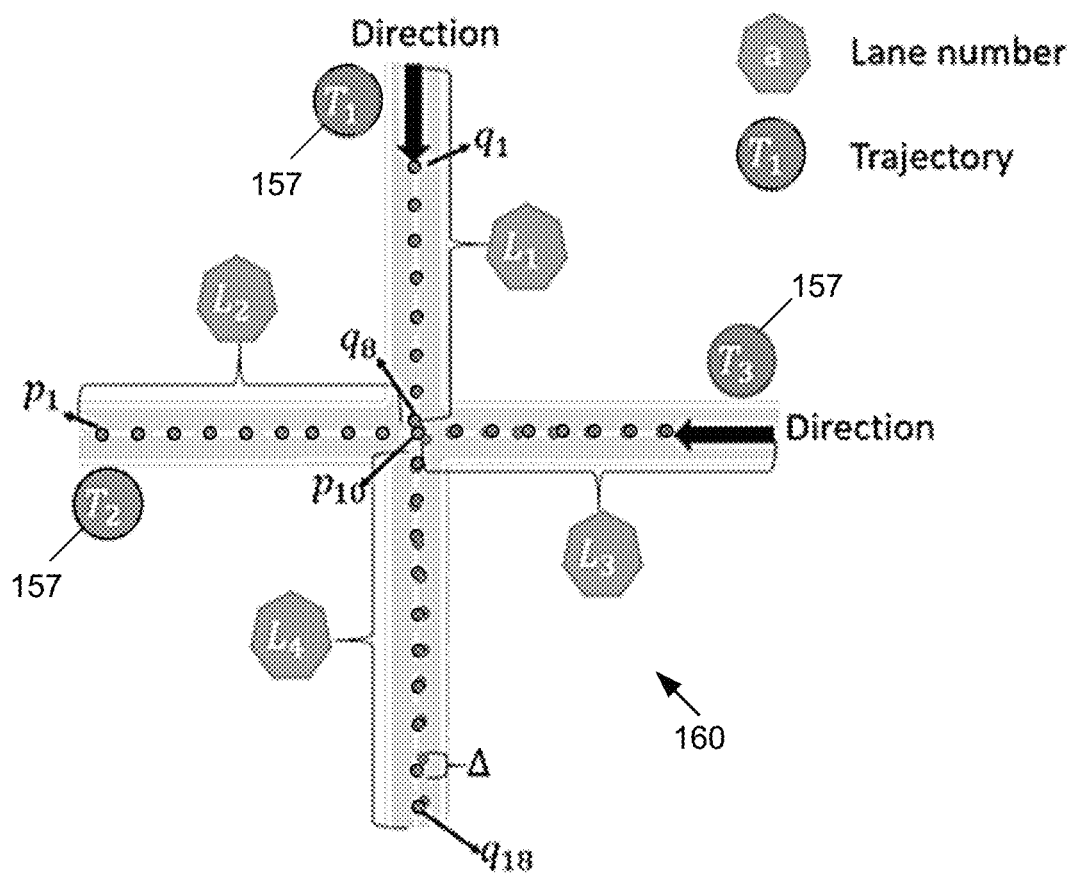
FIG. 2 illustrates an example of a lane identification application identifying a lane structure, according to various embodiments of the present disclosure.

Referring now to FIG. 2, shown is an example of the lane identification application 124 identifying a lane structure 160. FIG. 2 shows an intersection of single-direction lanes and three vehicle trajectories 157 $\mathcal{T}=\{T_1, T_2, T_3\}$. Starting with trajectory 157 $T_1$, as lane structure 160 $\mathcal{L}$ is empty in the beginning, the lane identification application 124 labels all points in trajectory 157 $T_1$ as new points and add them to the set of new points $S=\{p_i'=p_i, i\in[1,|T_1|]\}$. As all points in set S are consecutive, the lane identification application 124 creates lane $L_1=S$. After adding $L_1$ to the lane structure 160 ($\mathcal{L}$), the lane identification application 124 tests the distance between each point in trajectory 157 $T_2$ and each point in lane $L_1$, as is shown in FIG. 2. Considering the maximum distance $\Delta$ (predetermined threshold distance) shown in FIG. 2, every point except $p_{10}$ is a new point. Therefore, the set of new points will be $$S=\{p_i'=p_i|i=1, \ldots, 9, 11, \ldots, 17\}.$$

In set S, create lane $L_2$ with $\{p_1', \ldots, p_9'\}$ and lane $L_3$ with $\{p_{11}', \ldots, p_{17}'\}$ as the points in these two sets are consecutive. Now, the lane structure 160 ($\mathcal{L}$) will be updated as $\mathcal{L}=\{L_2, L_3, L_3\}$. As illustrated in FIG. 2, trajectory 157 enters lane $L_1$ at $q_8$ and exits lane $L_1$ at $q_8$, lane $L_1$ should be split into two lanes $L_1=\{q_1, \ldots, q_8\}$ and $L_4=\{q_9, \ldots, q_{18}\}$. Now, the lane structure 160 ($\mathcal{L}$) will be updated as $\mathcal{L}=\{L_1, L_2, L_3, L_4\}$. The next step is to test each point in trajectory 157 $T_3$, no point will be labeled as a new point as they either belong to lane $L_3$ or lane $L_4$. Finally, the lane identification application 124 obtains the complete lane structure 160 $\mathcal{L}=\{L_1, L_2, L_3, L_4\}$

EXPERIMENTAL RESULTS

In this section, results are presented from testing the disclosed approach with two examples of aerial videos 130, one capturing freeway segment traffic and another capturing roundabout traffic.

Trajectory Extraction from an Aerial Video of Freeway Segment Traffic. The aerial video 130 covers an 800-foot segment of the I-635 freeway. The aerial video 130 is captured by a drone with a 4K camera from 400 ft high with its camera towards the traffic on I-635 with a pitch angle −60 degree. The video is shot in 24 fps frame rate for 9 minutes and 6 seconds from 4:30 μm. With these camera parameters, the real-world coordinates of each vehicle in the video can be extracted by conducting camera calibration after vehicles are detected and tracked in the video.

Figure 3:
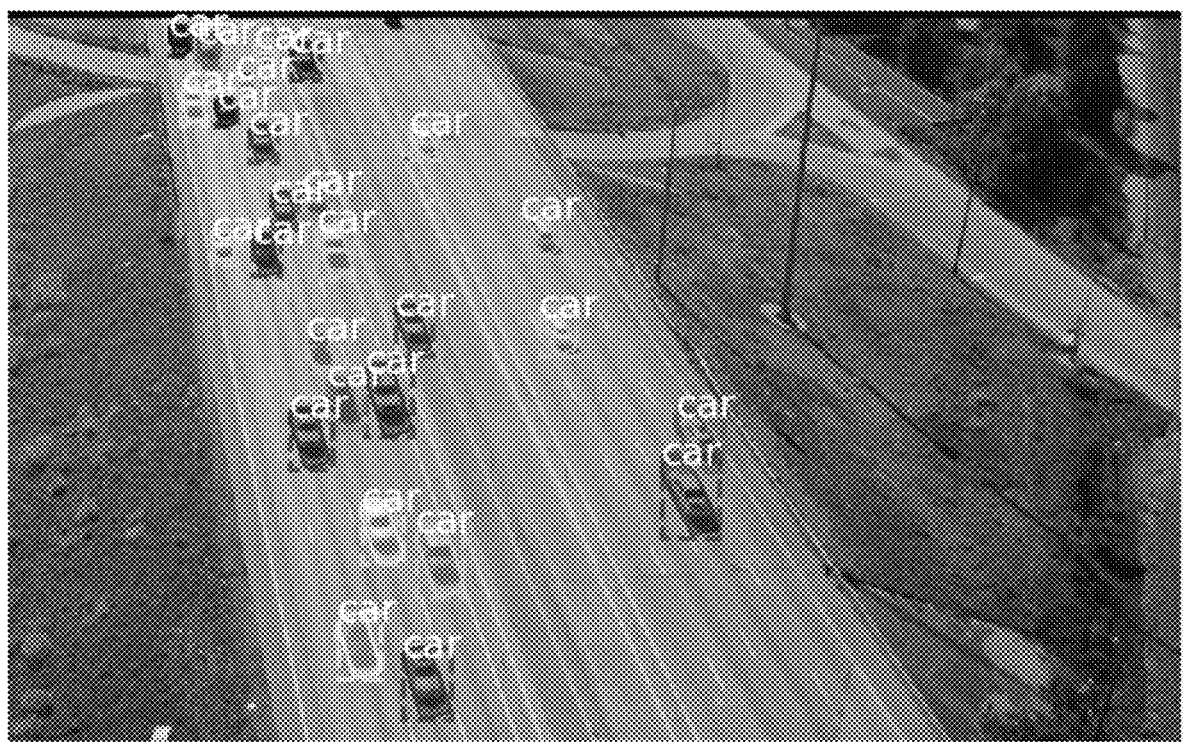
FIG. 3 illustrates an example of a vehicle identification and tracking application using a locally trained library to identify vehicles, according to various embodiments of the present disclosure.

The vehicle identification and tracking application 118 is able to detect and track vehicles in each frame of the aerial video 130 by applying the Mask R-CNN model. The disclosed approach can apply OpenCV background extraction and contour detection algorithms to generate training data 133 and validation data sets. The disclosed approach can also train the Mask R-CNN model with the training data 133 and create the model data 139. One testing result is shown in FIG. 3. As the video quality and camera angle of the aerial video 130 is similar with NGSIM data set, the results inform a comparison of the disclosed approach using Mask R-CNN with the machine vision system used in the NGSIM data set. When using the machine vision system from the NGSIM data set, the bounding boxes rarely match the vehicle shapes. Due to these detection errors, unrealistic speeds and accelerations often occur and trajectories often over run their leaders, resulting in false positive collisions. In comparison, results from the vehicle identification and tracking application 118 as depicted in FIG. 3 show that vehicles are detected more accurately than the machine vision system. Using the detection results of the vehicle identification and tracking application 118, vehicles can be easily tracked based on vehicle kinematic constraints.

Figure 4:
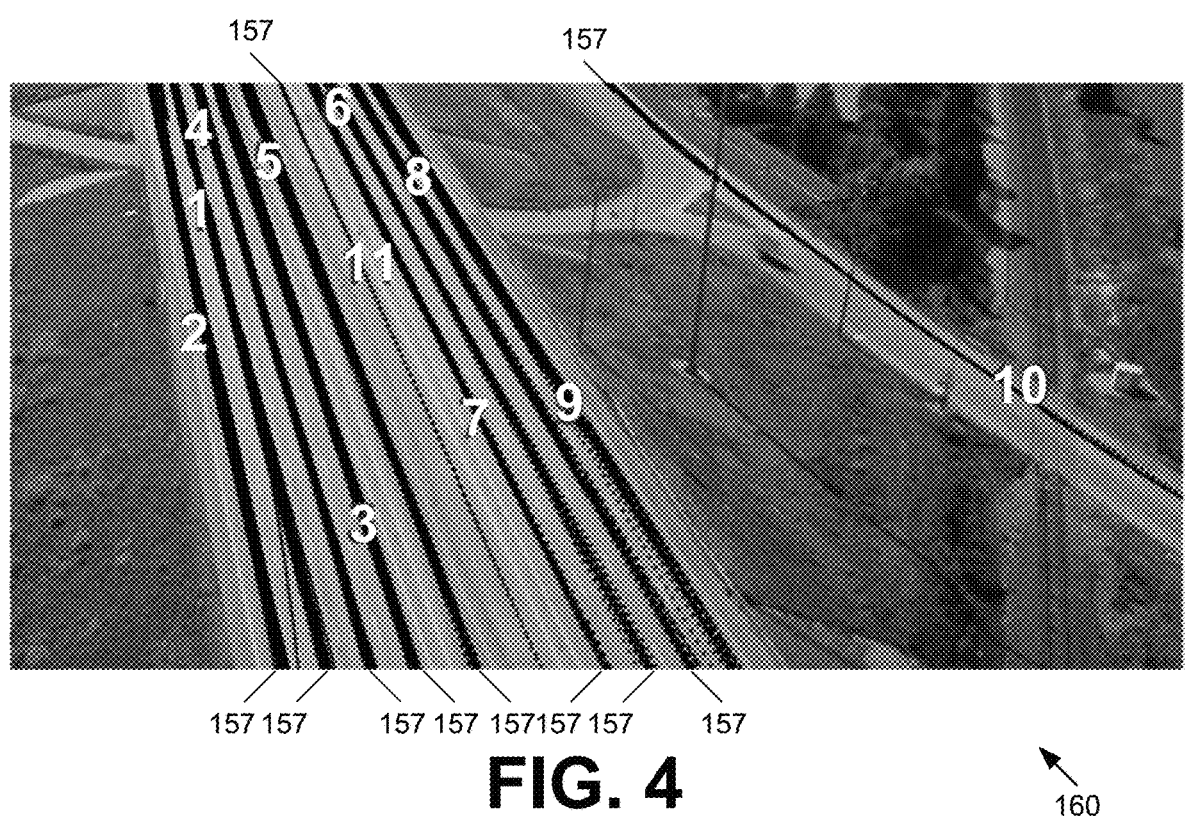
FIG. 4 illustrates an example of a lane identification application identifying lanes from an aerial video, according to various embodiments of the present disclosure.

Referring now to FIG. 4, shown is an example of the lane identification application 124 identifying a lane structure 160 based on vehicle trajectories 157 extracted from an aerial video 130. As shown in the depicted image of the aerial video 130, there are only ten parallel lanes and one bypass lane with no intersections. The lane identification application 124 can obtain the lane structure 160 and designate a respective lane number for each of the lanes in the lane structure 160. In FIG. 4, the number of each lane is labeled from one (1) to eleven (11), and the vehicle trajectories 157 extracted by the trajectory extraction application 121 are shown as lines or curves. Before the lane numbers are generated by the lane identification application 124, the extracted trajectories 157 with lane changes can be removed to prevent potential identification errors. Alternatively, if removal of vehicle trajectories 157 is not applicable, the actual lanes can be obtained by merging the identified lanes in the same direction.

With the vehicle trajectories 157 and the lane structure 160 extracted from the aerial video 130, the vehicle trajectories 157 with the lane numbers can be obtained by selecting the lane with minimum distance and label its lane number to each point of the trajectories. The disclosed approach can (with or without any post-processing) give smooth trajectory data with very few (or zero) "collisions of trajectories" or unrealistically large magnitudes of vehicle speeds, which are frequently found in NGSIM data set. Results indicate that the disclosed approach has higher performance than the machine vision system used to extract NGSIM data set.

Trajectory Extraction from an Aerial Video of Roundabout. In another example, results from testing the disclosed approach with an aerial video 130 of roundabout traffic are presented. The aerial video 130 is shot with a drone hovering above a roundabout from a pitch angle −90 degree with a 4K camera. The video is captured in a similar condition with the HighD data. However, the structure of roundabout is more complicated than the NGSIM data set and the HighD data set. Further, the camera is rotating and shifting across the time. The disclosed approach successfully identifies the vehicles in the video, corrects camera rotation and shifting, and extracts the lane structure of the roundabout. The results are presented and discussed below.

Figure 5:
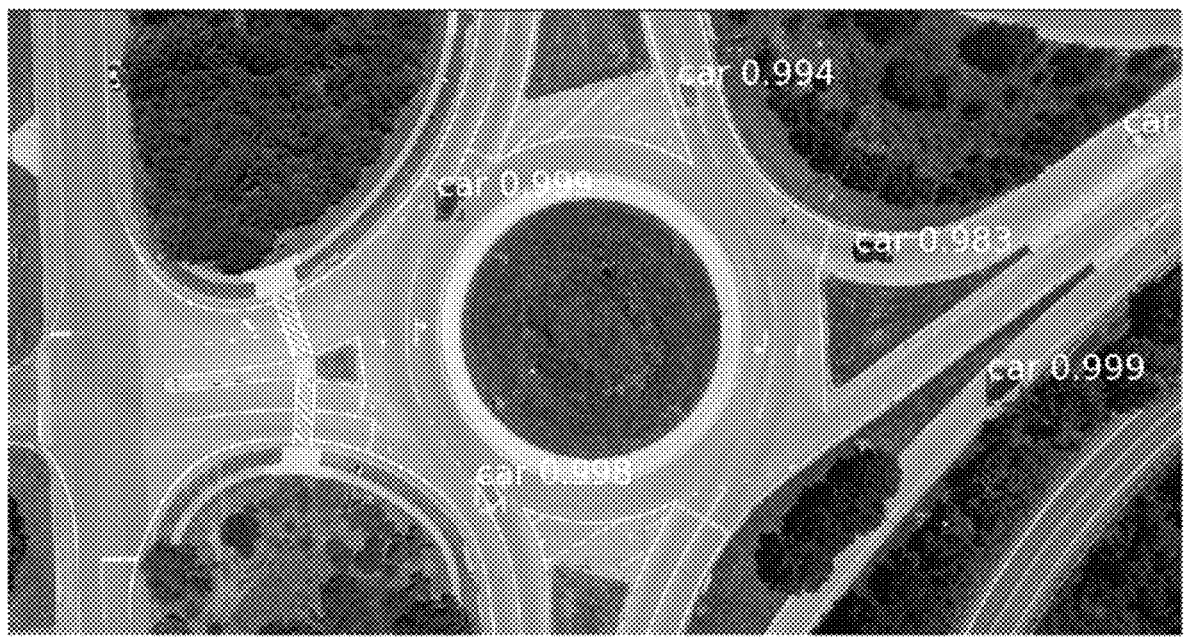
FIG. 5 illustrates an example of vehicle identification results for a vehicle identification and tracking application, according to various embodiments of the present disclosure.

The vehicle identification and tracking application 118 creates the training data 133 to train the Mask R-CNN library 127 and output the model data 139. The vehicle identification and tracking application 118 uses the library 127 to apply the model data 139 to the aerial video 130 of the roundabout. The result is shown in FIG. 5. In comparison with detection results from the HighD data set, the vehicle identification and tracking application 118 can obtain results that are at least as accurate as U-Net in HighD data set. Results indicate that the deep neural network is a proper method to detect vehicles in such aerial videos 130. It should be noted that the vehicle on the left-top corner (FIG. 5) is not detected as it is static during the video recording time.

Figure 6:
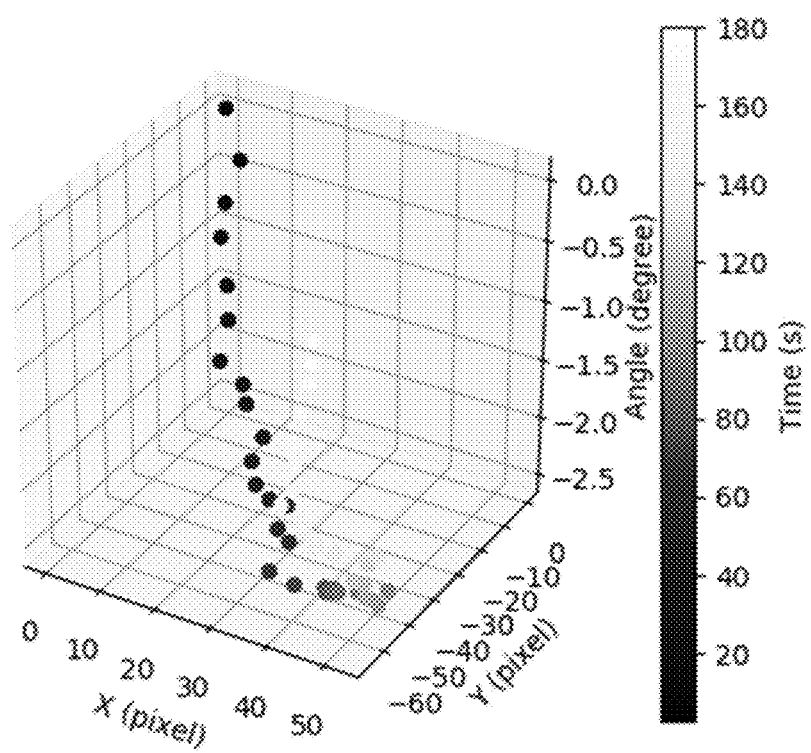
FIG. 6 is a plot of results of a trajectory extraction application performing a camera rotation and shifting correction for a trajectory extraction, according to various embodiments of the present disclosure.

As the camera that recorded the aerial video 130 was rotating and shifting when capturing the roundabout traffic, the trajectory extraction application 121 corrects for camera rotation and shifting correction of the aerial video 130. As shown in FIG. 6, the trajectory extraction application 121 calculates the rotation and shifting parameters by conducting the binary search and correlation-based matching algorithm. In FIG. 6, 'X, Y' represent the shifting of a frame in right and down direction in pixels, and 'Angle' represents the rotation movement of a frame in clockwise direction. As can be seen in FIG. 6, the aerial video 130 is taken by a camera 112 that is rotating anti-clockwise and shifting right upwards from 0s to about 100s and moving reversely from about 100s to 180s. By applying inverse transformation for each frames of the video based on the camera rotation and shifting parameters, the trajectory extraction application 121 obtains static background of the detected area. By selecting a reference point in a frame, calculating the relative coordinates 154 of detected vehicles and conducting camera calibration, the trajectory extraction application 121 is able to obtain the vehicle trajectories 157 from the aerial video 130.

Figure 7:
FIG. 7 illustrates results of a lane identification application identifying lanes of a roundabout, according to various embodiments of the present disclosure.

The lane identification application 124 can extract the lane structure 160 from the aerial video 130 after the vehicle trajectories 157 are obtained. As shown in FIG. 7, the lane identification application 124 detected a total of nineteen (19) lanes, numbered between one (1) and nineteen (19), from the aerial video 130. However, lanes 8, 17, and 18 are not correctly detected as there are only two vehicles passing the corresponding part of the roundabout. However, the lane identification application 124 can avoid such lane detection errors by causing the camera 112 to collect the aerial video 130 over a period of time during which more than two vehicles pass the part of the roundabout corresponding to lanes 8, 17, and 18. With the lane structure 160 extracted as shown in FIG. 7, the trajectory extraction application 121 extracted the trajectories 157 with the lane number labeled on each point of the trajectories 157. The disclosed approach can easily capture the lane changing behavior of vehicles on the roundabout of the aerial video 130.

Figure 8:
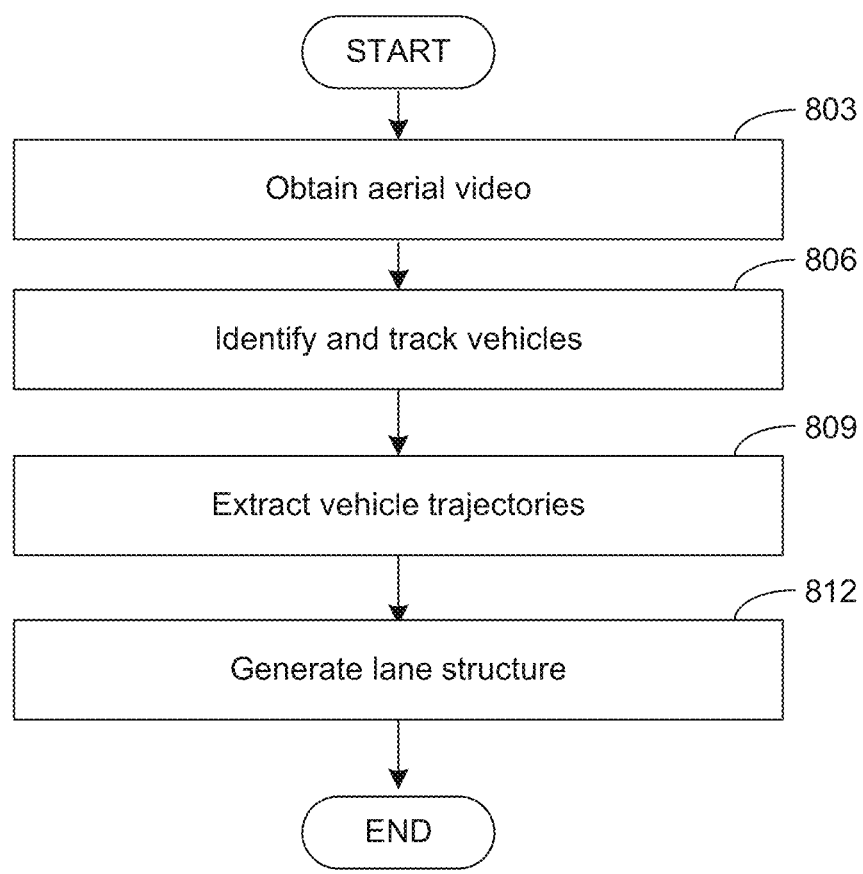
FIG. 8 is a flowchart that provides an example of an approach for a video-based intelligent road traffic universal analysis tool executed in a computing device in the networked environment of FIG. 1, according to various embodiments of the present disclosure.

Referring now to FIG. 8, shown is a flowchart that provides an example of an approach for a video-based intelligent road traffic universal analysis tool. It is understood that the flowchart of FIG. 8 provides merely an example of the many different types of functional arrangements that may be performed to implement the operation of the vehicle identification and tracking application 118, the trajectory extraction application 121, and the lane identification application 124 as described herein. Additionally, the flowchart of FIG. 8 may be viewed as depicting an example of steps of a method implemented in the computing environment 103.

Beginning at box 803, the vehicle identification and tracking application 118 obtains an aerial video 130. In one example, the aerial video 130 is a serial video obtained from the camera 112 showing a live video feed of a location that captures a traffic segment of interest. In another example, the aerial video 130 is stored in the data store 115.

At box 806, the vehicle identification and tracking application 118 can identify and track vehicles. The vehicle identification and tracking application 118 obtains a vehicle track 142 that includes pixel coordinate points 145 associated with a vehicle representation extracted from the aerial video 130 of a location of a traffic segment of interest.

The vehicle tracks 142 can be generated by the vehicle identification and tracking application 118 analyzing the aerial video 130. For example, the vehicle identification and tracking application 118 can generate training data 133 from a reference video showing a plurality of vehicles at the location. The vehicle identification and tracking application 118 can extract contours of a plurality of vehicles to create the training data 133 and provide the training data to Mask R-CNN, a machine learning tool, or other library 127 that can be used to create the vehicle tracks 142. By providing the training data 133 to the library 127, the vehicle identification and tracking application 118 can also generate a machine learning model or model data 139.

Another way the vehicle identification and tracking application 118 can identify and track vehicles in the aerial video 130 is by generating vehicle identifiers 148. The vehicle identification and tracking application 118 can generate a vehicle identifier 148 associated with the vehicle representation extracted from the aerial video, for example by applying a locally-trained version of the Mask R-CNN model running as the library 127, or applying a different machine learning model based on the model data 139, to the aerial video 130.

Referring now to box 809, the trajectory extraction application 121 can convert the pixel coordinate points 145 to relative coordinate points 151 based at least in part on detecting a rotation parameter relative to a reference point and a shifting parameter relative to a reference frame. The reference point can be a reference real-world coordinate point, or a reference point whose real-world coordinate is known. In some examples, the reference frame is a previous frame relative to a current frame of the aerial video 130. Knowing the relative coordinate points 151, the trajectory extraction application 121 can generate real-world coordinate points 154 for the vehicle representations extracted from the aerial video 130.

Following converting the pixel coordinate points 145 to relative coordinate points 151, the trajectory extraction application 121 can extract, based on the vehicle track 142 obtained at box 803, at least one vehicle trajectory 157. The trajectory extraction application 121 can also generate measures 163 that are based on the at least one vehicle trajectory 157. For example, the disclosed approach can include multiple vehicle trajectories 157. Based on these extracted trajectories 157, the trajectory extraction application 121 can generate an aggregated measure or a disaggregated measure. Example disaggregated measures include speed, acceleration profile, or travel delay, whereas example aggregated measures include throughput, aggregate speed, or a density.

At box 812, the lane identification application 124 can generate a lane structure 160 having at least one lane identifier based on the at least one vehicle trajectory 157. In some examples, the lane identification application 124 generates the lane identifier by identifying a cluster of real-world coordinate points 154 that include at least two real-world coordinate points 154 that are a predetermined threshold distance or less from each other. In this example, at least one of the real-world coordinate points 154 is associated with the relative coordinate points 151 for the at least one vehicle trajectory 157.

Additionally, the lane identification application 124 can generate the at least one lane identifier based on a first real-world coordinate point 154 being a predetermined threshold distance or greater from a second real-world coordinate point 154 associated with the relative coordinate points 151 for the at least one vehicle trajectory 157. Using the vehicle contours and lane paths, the disclosed approach identifies the spatial and timing relationship between identified vehicles, e.g., preceding and following vehicles on the same lane and the neighboring lanes. Such information is important to construct critical traffic performance measures (e.g., time headway, spacing, and accepted gap for lane changing) for various transportation engineering applications (e.g., travel time estimation, incident identification, and congestion management). And such vehicle topological relationships are also important in the context of connected vehicles in identifying neighboring vehicles to establish feasible communications. Following box 812, the process can proceed to completion. In some examples, such as when it is advantageous to iterate or monitor a video feed associated with the aerial video 130, the process can return to box 303.

Figure 9:
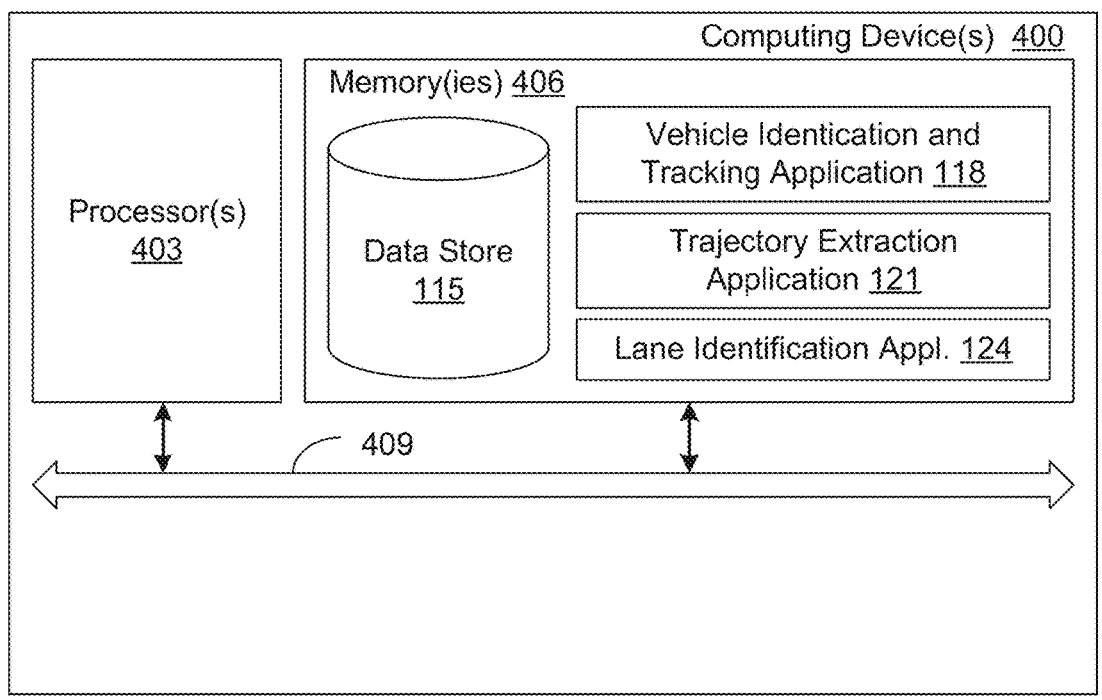
FIG. 9 is a schematic diagram of an example of a computing device employed in the networked environment of FIG. 1, according to various embodiments of the present disclosure.

With reference to FIG. 9, shown is a schematic block diagram of a computing device 400 that can be used to implement various embodiments of the present disclosure. The computing device 400 includes at least one processor circuit, for example, having a processor 403 and a memory 406, both of which are coupled to a local interface 409. To this end, the computing device 400 may comprise, for example, at least one server computer or like device. The local interface 409 may comprise, for example, a data bus with an accompanying address/control bus or other bus structure as can be appreciated.

The computing device 400 may include an input/output device such as a display. The input/output device may comprise, for example, one or more devices such as a keyboard, mouse, gesture input device, touch screen (resistive, capacitive, or inductive), microphone, liquid crystal display (LCD) display, gas plasma-based flat panel display, organic light emitting diode (OLED) display, projector, or other types of input/output device, etc.

Stored in the memory 406 are both data and several components that are executable by the processor 403. In particular, stored in the memory 406 and executable by the processor 403 may be a vehicle identification and tracking application 118, a trajectory extraction application 121, a lane identification application 124, and/or other applications. Also stored in the memory 406 may be a data store 115 and other data. The computing device 400 can also include one or more converter(s) to interface with the camera 112 (FIG. 1) and/or other peripherals.

It is understood that there may be other applications that are stored in the memory 406 and are executable by the processor 403 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Delphi®, Flash®, or other programming languages.

A number of software components are stored in the memory 406 and are executable by the processor 403. In this respect, the term "executable" means a program file that is in a form that can ultimately be run by the processor 403. Examples of executable programs may be, for example, a compiled program that can be translated into machine code in a format that can be loaded into a random access portion of the memory 406 and run by the processor 403, source code that may be expressed in proper format such as object code that is capable of being loaded into a random access portion of the memory 406 and executed by the processor 403, or source code that may be interpreted by another executable program to generate instructions in a random access portion of the memory 406 to be executed by the processor 403, etc. An executable program may be stored in any portion or component of the memory 406 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 406 is defined herein as including both volatile and nonvolatile memory and data storage components. Volatile components are those that do not retain data values upon loss of power. Nonvolatile components are those that retain data upon a loss of power. Thus, the memory 406 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 403 may represent multiple processors 403 and the memory 406 may represent multiple memories 406 that operate in parallel processing circuits, respectively. In such a case, the local interface 409 may be an appropriate network that facilitates communication between any two of the multiple processors 403, between any processor 403 and any of the memories 406, or between any two of the memories 406, etc. The local interface 409 may comprise additional systems designed to coordinate this communication, including, for example, performing load balancing. The processor 403 may be of electrical or of some other available construction.

Although the vehicle identification and tracking application 118, trajectory extraction application 121, lane identification application 124, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

Although the flowchart of FIG. 8 shows a specific order of execution, it is understood that the order of execution may differ from that which is depicted. For example, the order of execution of two or more blocks may be scrambled relative to the order shown. Also, two or more blocks shown in succession in FIG. 8 may be executed concurrently or with partial concurrence. Further, in some embodiments, one or more of the blocks shown in FIG. 8 may be skipped or omitted (in favor, e.g., conventional scanning approaches). In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the vehicle identification and tracking application 118, trajectory extraction application 121, and lane identification application 124 that comprises software or code can be embodied in any non-transitory computer-readable medium for use by or in connection with an instruction execution system such as, for example, a processor 403 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Additional details is available in "Real-World Trajectory Extraction from Aerial Videos—A Comprehensive and Effective" by D. Zhao and X. Li, which is hereby incorporated by reference in its entirety and included as an Appendix.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims. In addition, all optional and preferred features and modifications of the described embodiments and dependent claims are usable in all aspects of the disclosure taught herein. Furthermore, the individual features of the dependent claims, as well as all optional and preferred features and modifications of the described embodiments are combinable and interchangeable with one another.

Although embodiments have been described herein in detail, the descriptions are by way of example. The features of the embodiments described herein are representative and, in alternative embodiments, certain features and elements may be added or omitted. Additionally, modifications to aspects of the embodiments described herein may be made by those skilled in the art without departing from the spirit and scope of the present invention defined in the following claims, the scope of which are to be accorded the broadest interpretation so as to encompass modifications and equivalent structures.

The term "substantially" is meant to permit deviations from the descriptive term that don't negatively impact the intended purpose. Descriptive terms are implicitly understood to be modified by the word substantially, even if the term is not explicitly modified by the word substantially.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. The term "about" can include traditional rounding according to significant figures of numerical values. In addition, the phrase "about 'x' to 'y'" includes "about 'x' to about 'y'".

Therefore, the following is claimed:

1. A method for vehicle trajectory extraction, comprising:
   obtaining, by a computing device, a vehicle track comprising pixel coordinate points associated with a vehicle representation extracted from an aerial video of a location;
   converting, by the computing device, the pixel coordinate points to relative coordinate points based at least in part on detecting a rotation parameter relative to a reference point and a shifting parameter relative to a reference frame;
   extracting, by the computing device, at least one vehicle trajectory based at least in part on the vehicle track and the relative coordinate points; and
   generating, by the computing device, a lane structure based at least in part on the at least one vehicle trajectory.

2. The method of claim 1, further comprising:
   generating, by the computing device, a machine learning model based at least in part on training data associated with the location, wherein the training data is based at least in part on extracting contours of a plurality of vehicles from a reference video showing the plurality of vehicles at the location.

3. The method of claim 1, further comprising:
   generating, by the computing device and based at least in part on applying a machine learning model to the aerial video of the location, a vehicle identifier associated with the vehicle representation extracted from the aerial video.

4. The method of claim 1, wherein the at least one vehicle trajectory comprises a plurality of vehicle trajectories, the method further comprising:
   generating, by the computing device, at least one of an aggregated measure or a disaggregated measure based at least in part on the plurality of vehicle trajectories, wherein the disaggregated measure comprises at least one of a speed, an acceleration profile, or travel delay, wherein the aggregated measure comprises at least one of a throughput, an aggregate speed, or a density.

5. The method of claim 1, wherein the reference frame is a previous frame relative to a current frame of the aerial video.

6. The method of claim 1, wherein the lane structure comprises at least one lane identifier, the method further comprising:
   generating, by the computing device, the at least one lane identifier based at least in part on identifying a cluster of real-world coordinate points comprising at least two real-world coordinate points that are a predetermined threshold distance or less from each other, wherein at least one of the real-world coordinate points is associated with the relative coordinate points for the at least one vehicle trajectory.

7. The method of claim 1, wherein the lane structure comprises at least one lane identifier, the method further comprising:
   generating, by the computing device, the at least one lane identifier based at least in part on a first real-world coordinate point being a predetermined threshold distance or greater from a second real-world coordinate point associated with the relative coordinate points for the at least one vehicle trajectory.

8. The method of claim 1, wherein the reference point comprises a reference real-world coordinate point.

9. The method of claim 1, the method further comprising:
   generating, by the computing device and based at least in part on the relative coordinate points, a real-world coordinate point of the vehicle representation extracted from the aerial video.

10. A system for vehicle trajectory extraction, comprising:
    at least one computing device; and
    an application executable in the at least one computing device, wherein, when executed, the application causes the at least one computing device to at least:
       obtain a vehicle track comprising pixel coordinate points associated with a vehicle representation extracted from an aerial video of a location;
       convert the pixel coordinate points to relative coordinate points based at least in part on detecting a rotation parameter relative to a reference point and a shifting parameter relative to a reference frame;
       extract at least one vehicle trajectory based at least in part on the vehicle track and the relative coordinate points; and
       generate a lane structure based at least in part on the at least one vehicle trajectory.

11. The system of claim 10, wherein, when executed, the application causes the at least one computing device to at least:
    generate a machine learning model based at least in part on training data associated with the location, wherein the training data is based at least in part on extracting contours of a plurality of vehicles from a reference video showing the plurality of vehicles at the location.

12. The system of claim 10, wherein, when executed, the application causes the at least one computing device to at least:
    generate, based at least in part on applying a machine learning model to the aerial video of the location, a vehicle identifier associated with the vehicle representation extracted from the aerial video.

13. The system of claim 10, wherein the at least one vehicle trajectory comprises a plurality of vehicle trajectories, wherein, when executed, the application causes the at least one computing device to at least:
    generate at least one of an aggregated measure or a disaggregated measure based at least in part on the plurality of vehicle trajectories, wherein the disaggregated measure comprises at least one of a speed, an acceleration profile, or travel delay, wherein the aggregated measure comprises at least one of a throughput, an aggregate speed, or a density.

14. The system of claim 10, wherein the lane structure comprises at least one lane identifier, wherein, when executed, the application causes the at least one computing device to at least:
    generate the at least one lane identifier based at least in part on identifying a cluster of real-world coordinate points comprising at least two real-world coordinate points that are a predetermined threshold distance or less from each other, wherein at least one of the real-world coordinate points is associated with the relative coordinate points for the at least one vehicle trajectory.

15. The system of claim 10, wherein the lane structure comprises at least one lane identifier, wherein, when executed, the application causes the at least one computing device to at least:
    generate the at least one lane identifier based at least in part on a first real-world coordinate point being a predetermined threshold distance or greater from a second real-world coordinate point associated with the relative coordinate points for the at least one vehicle trajectory.

16. The system of claim 10, wherein the reference point comprises a reference real-world coordinate point, wherein, when executed, the application causes the at least one computing device to at least:

generate, based at least in part on the reference real-world coordinate point, a real-world coordinate point of the vehicle representation extracted from the aerial video.

17. A non-transitory computer-readable medium embodying specific instructions for vehicle trajectory extraction that, when executed, cause a computing device to at least:

obtain a vehicle track comprising pixel coordinate points associated with a vehicle representation extracted from an aerial video of a location;

convert the pixel coordinate points to relative coordinate points based at least in part on detecting a rotation parameter relative to a reference point and a shifting parameter relative to a reference frame;

extract at least one vehicle trajectory based at least in part on the vehicle track and the relative coordinate points; and generate a lane structure based at least in part on the at least one vehicle trajectory.

18. The non-transitory computer-readable medium of claim 17, wherein the instructions, when executed, further cause the computing device to at least:

generate a machine learning model based at least in part on training data associated with the location, wherein the training data is based at least in part on extracting contours of a plurality of vehicles from a reference video showing the plurality of vehicles at the location.

19. The non-transitory computer-readable medium of claim 17, wherein the lane structure comprises at least one lane identifier, wherein the instructions, when executed, further cause the computing device to at least:

generate the at least one lane identifier based at least in part on identifying a cluster of real-world coordinate points comprising at least two real-world coordinate points that are a predetermined threshold distance or less from each other, wherein at least one of the real-world coordinate points is associated with the relative coordinate points for the at least one vehicle trajectory.

20. The non-transitory computer-readable medium of claim 17, wherein the lane structure comprises at least one lane identifier, wherein the instructions, when executed, further cause the computing device to at least:

generate the at least one lane identifier based at least in part on a first real-world coordinate point being a predetermined threshold distance or greater from a second real-world coordinate point associated with the relative coordinate points for the at least one vehicle trajectory.

* * * * *